March 12, 1968    J. A. McPHERSON    3,372,899
RADIO ACTUATED AND MANUALLY OPERABLE PILOT VALVE CONTROLS
Filed Sept. 15, 1965    3 Sheets-Sheet 1
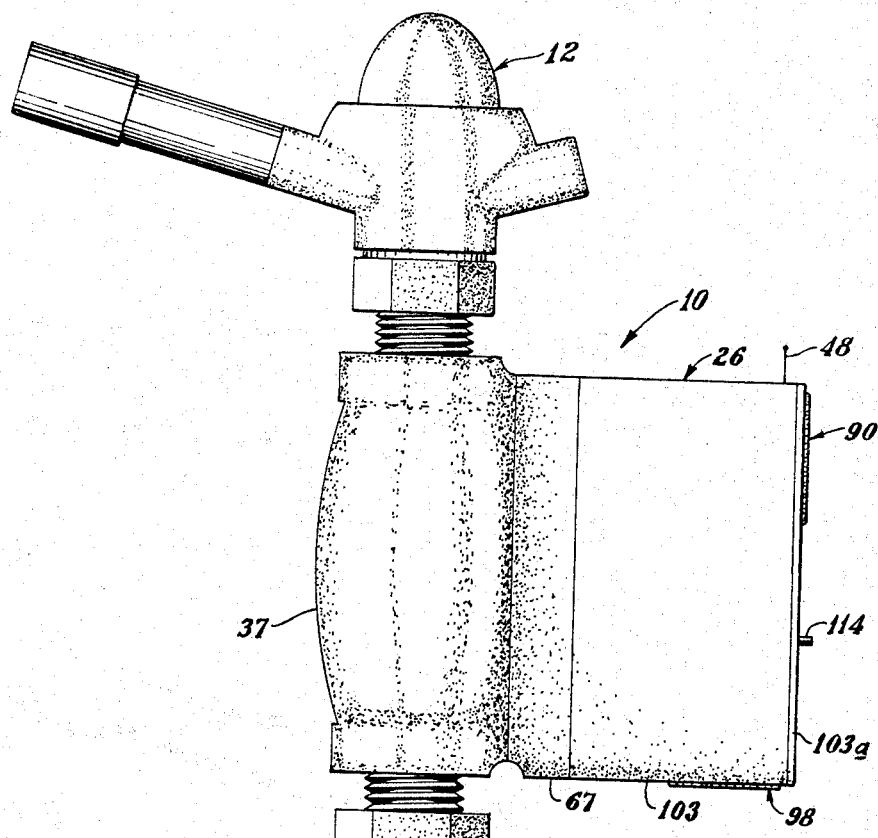
Fig. 1
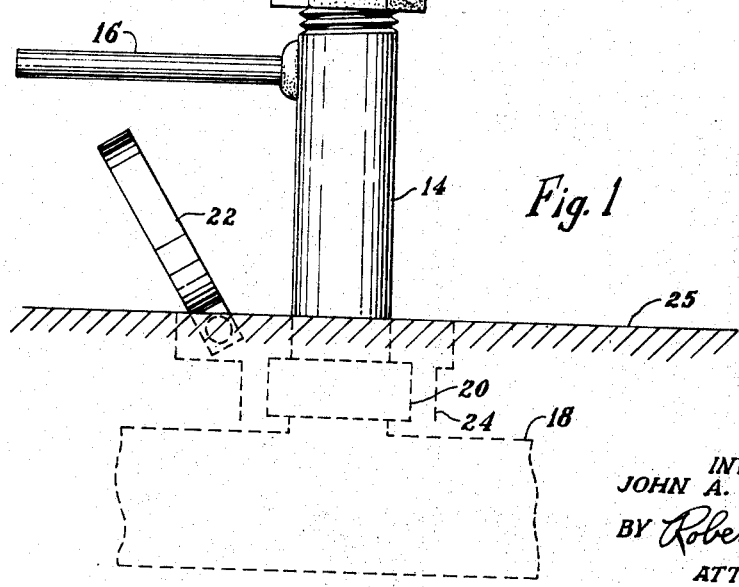
INVENTOR,
JOHN A. McPHERSON
BY Robert A. Spray
ATTORNEY March 12, 1968

J. A. McPHERSON 3,372,899

RADIO ACTUATED AND MANUALLY OPERABLE PILOT VALVE CONTROLS

Filed Sept. 15, 1965

INVENTOR,
JOHN A. McPHERSON
BY Robert A. Spray
ATTORNEY

United States Patent Office 3,372,899
Patented Mar. 12, 1968

3,372,899
RADIO ACTUATED AND MANUALLY OPERABLE PILOT VALVE CONTROLS
John A. McPherson, Palo Alto, Calif., assignor to Robert Trent Jones, Inc., Palo Alto, Calif.
Filed Sept. 15, 1965, Ser. No. 487,477
5 Claims. (Cl. 251—26)

ABSTRACT OF THE DISCLOSURE

An electrically-actuated irrigation system, providing radio-controlled outlets, particularly advantageous for existing sprinkler installations, as on golf courses; for no control wiring need be installed, and existing waterlines may be used. The sprinkler outlets each have a line valve urged by line pressure to open position, and have conveniently-provided control means for the line valve, including a pair of independently-actuated control valves for regulating pressure in a chamber which hydraulically holds the line valve closed unless irrigation-actuation is desired.

This invention relates to concepts of irrigation, and to an embodiment thereof; and, by concepts of the invention, radio-control actuation of irrigation outlets is provided.

The invention is particularly beneficial for golf-course watering systems, the radio-control of the sprinkler outlets avoiding the need and expense of control wiring for automatic actuation of the watering system, such control wiring being, due to the nature of golf, desirably buried underground.

Also, due to the nature of golf, a fairly accurately measured amount of the irrigation water is desired, providing ground-watering in an amount between fairly close limits; and thus an easily-regulated method of sprinkler-actuation is particularly desirable. Moreover, adding to the desirability of control of individual sprinkler outlets, the sprinklers at various locations along a single water supply-line will be desired to dispense water for different lengths of time, due to the terrain or course features along that single supply-line.

For new courses, the control wiring for automatic actuation may be relatively inexpensively buried as the course is being built and graded, but it is an expense which is avoided by the present concepts; and on existing courses, the burying of the control wiring is a relatively large expense avoided by the present concepts.

Thus, the description assumes the situation of an existing course, which already has buried water lines with encased underground outlets to which outlet-fittings having sprinkler-heads may be quickly connected.

The concepts of the invention are set forth more specifically in the following detailed description of an embodiment thereof to illustrate the inventive concepts, reference being had to the accompanying somewhat schematic and diagrammatic drawings in which:

FIG. 1 is a side-elevational view of a sprinkler assembly, embodying a radio-controlled valve, fitted into an existing water-line outlet;

Figure 2:
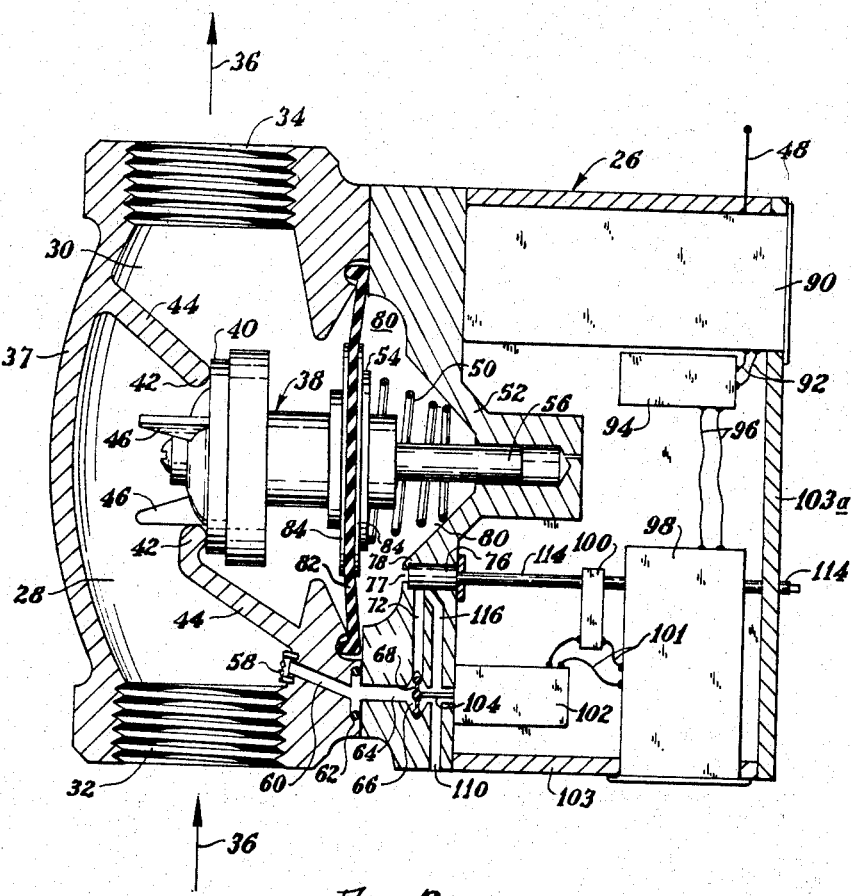
FIG. 2 is a vertical cross-sectional view through the valve thereof, in enlarged scale.
Figure 3:
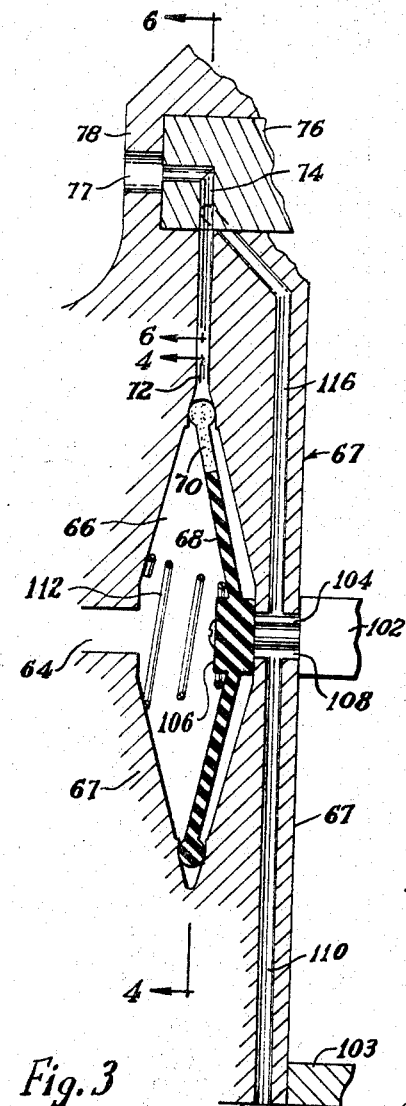
FIG. 3 is a cross-sectional view, in greatly-enlarged scale, illustrating details of control and operational components shown in FIG. 2.
Figure 6:
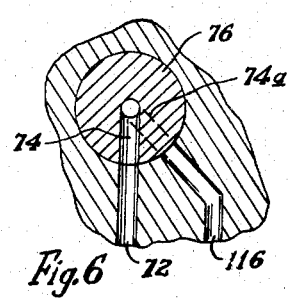
FIG. 6 is a detail view, taken generally as indicated by view-line 6—6 of FIG. 3.
Figure 4:
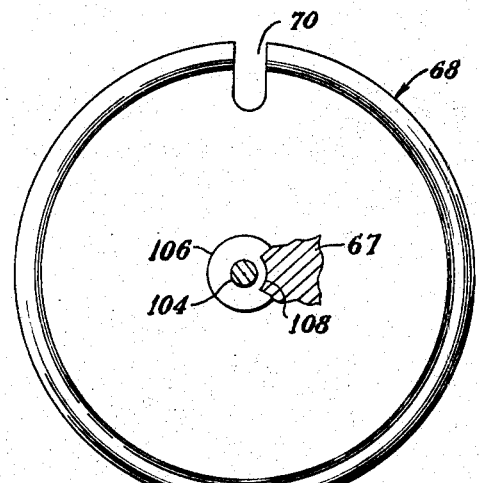
FIG. 4 is a detail view, taken generally along view-line 4—4 of FIGS. 3 and 5.
Figure 5:
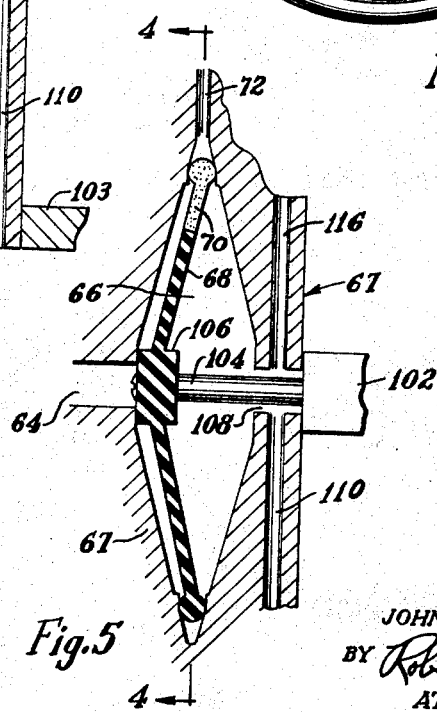
FIG. 5 is a view similar to a portion of FIG. 3, but illustrating the parts in another position of operation as hereinafter described.

As shown in the drawings, irrigation is provided by a sprinkler assembly 10 for installation at the desired field outlet desired. A quantity of these assemblies would be used, according to the particular irrigation layout.

FIG. 1 illustrates such a sprinkler assembly 10, as shown including at its top a sprinkler head 12, and at its bottom a coupler nipple 14 with a coupler key or handle 16. The coupler nipple 14, it will be understood, will be coupled to the water supply line 18 by a quick-coupler union 20, various forms of which are available; and coupling would be effected by raising a cover lid 22 of a casing tube 24 in which is the quick-coupler 20. The supply line 18, coupler 20, and casing tube are buried underground, the ground-line being indicated at 25.

The parts so far mentioned by number may be of standard or known construction, and, as such, form no part of the present invention except as they are utilized in combination with radio-controlled irrigation concepts.

According to concepts of the present invention, the flow of irrigation water from the header line 18 and nipple 14 to sprinkler head 12 is controlled by a radio-controlled valve 26, an embodiment of which is illustrated in FIGS. 1 and 2, and as to further interior details in FIG. 3 through 6.

Turning to FIG. 2, it is seen that the radio-controlled valve 26 has a flow-inlet chamber 28 and a flow-outlet chamber 30, threaded female fittings at inlet and outlet being respectively indicated at 32 and 34, and the direction of flow being indicated by flow-indicator arrows 36. These parts are in a flow-pipe casing 37.

Operatively separating in a valving manner the inlet chamber 28 and outlet chamber 30 is a valve body 38, the operating seating-face thereof being indicated at 40. The valve-face 40 seats against a circular valve seat 42 provided by the ends of interior walls 44 which separate inlet and outlet chambers 28 and 30, the valve body 38 being provided with three guide-prongs 46 which engage the inner face of the valve-seat 42 to guide the movement and positioning of the valve body 38.

Valve-operation will now be described in detail, it being pointed out preliminarily that the valve body 38 is shown in FIG. 2 in a valve-closed position (valve-face 40 valvingly seating against valve-seat 42), and that valve-opening is controlled by a radio impulse reaching the control antenna 48.

The valve-closure is shown as urged by two means. One valve-closure means is a compression spring 50, one end of which bears against an interior frame member 52 of the valve 26, and the other end of which bears against an abutment disk 54 fixed on the valve stem 56.

The other valve-closure means is a pressure means actuated by line pressure in the inlet chamber 28 (which of course is kept pressurized at line pressure by the pressure in inlet nipple 14). As shown, water at inlet pressure passes through a small screen 58 into a passage 60, through the central hole of a O-ring 62, and then into a passage 64 which leads to first control chamber 66, shown in FIG. 2 but more clearly illustrated in FIG. 3. These components 64 and 66, and related parts and passages, are shown in a body-structure 67 which includes frame-member 52.

A pressure-control means shown as a circular diaphragm 68 is disposed in chamber 66, the operating character and purpose of diaphragm 68 being described in connection with its operation hereinafter. However, it will be noted (in FIG. 4) that the diaphragm is not peripherally-continuous, but is provided with a notch 70 through which the line pressure emerges from chamber 66 to a passage 72.

Passage 72 leads to an internal passage 74 of an auxiliary control valve 76 (the character of which will be described hereinafter), and from passage 74 to a passage 77 of the internal wall 78 which confronts a control chamber 80 (FIG. 2). (The wall 78 is a continuation of internal frame member 52 already mentioned.)

The control chamber 80 is closed by a pressure-control means shown by a circular diaphragm 82 suitably affixed as by retainer disks 84 to the valve stem 56. Thus, when water line-pressure enters the chamber 80 (through components just described: 32, 28, 58, 60, 62, 64, 66, 70, 72, 74, 77), the pressure in chamber 80 exerts a force on diaphragm 82 to hold the valve 38 closed.

It is noted that the effective area of retainer disks 84 and diaphragm 82 is greater than the effective area of the valve face 40; thus the force-differential maintains valve-closure even though line pressure is also in valve-opening direction against valve-face 40. However, the spring 50 is not of sufficient force to maintain valve closure against the force of line pressure on valve-face 40, apart from the force-differential just explained.

Now will be described the means for opening the valve 38. There are two independent valve-opening means, and both will be explained as operative by a venting of pressure in chamber 80. One means is a radio-operated means, and one is a manual means, the radio-operated means now to be explained.

The radio-controlled valve-opening means includes a radio receiver 90 which, through suitable circuitry 92 leads to a relay 94; and circuitry 96 leads from the relay 94 to a battery 98 and a control unit 100 and circuitry 101 to a powered control means 102. The details of the particular radio system employed form no part of the present application, and are thus shown and described only schematically; and the control means 102 is contemplated to be a so-called "heat motor" (which operates by thermal expansion of body material); although also contemplated is a solenoid for the control means 102, preferably of a ratchet type or other type which will maintain a moved position once an electric impulse is received without a requirement of a continuous source of electric power. The parts are shown in a casing 103 capped by a plate 103a.

The operation of the control means 102 (of whatever particular type, as just explained) is, in a valve-opening operation, to push (leftwardly, as shown) on a control rod 104 (FIGS. 2, 3 and 5) which is connected to diaphragm 68, it being noted that diaphragm 68 is centrally provided with a valve body 106. This movement (leftwardly) of control rod 104 causes the diaphragm 68 to move (leftwardly) to cause its valve body 106 to operatively cover the line-pressure passage 64 and to open (FIG. 5) a passage 108 which leads to a discharge passage 110 which discharges to atmosphere, that is, to the outside surface of the valve 26.

(It will be noted that although control rod 104 is axially positioned in passage 108, it does not block that passage; and it will be further noted that the diaphragm had been held in a (rightwardly-disposed) vent-closing position by the pressure-differential of line pressure on the line (left) side of diaphragm 68 in contrast to atmospheric pressure on the venting (right) side of diaphragm 68. A spring 112 (FIG. 3) may be used also, if desired, to urge diaphragm 68 to vent-closing position, and to urge the return of control rod 104 to vent-closing position upon de-energization of control means 102.)

This venting of chamber 66 also vents chamber 80 (FIG. 2), back through components 77, 74, 72, 70, 108, and 110; and the venting of chamber 80 relieves the valve-closing force on diaphragm 82, permitting the main valve 38 to open under line pressure in main inlet chamber 28.

The manual means for opening main valve 38 is now to be described, this means also achieving that effect by a venting of chamber 80.

This manual means utilizes an auxiliary control valve 76 (FIGS. 2, 3, and 6) which has a manually-operable control rod 114 extending outwardly of the valve casing 26, by which the valve 76 can be rotated to position its passage 74 in a venting position 74a (shown in dashed lines in FIG. 6) which is in registry with an intermediate vent passage 116. This passage 116 communicates with the passage 108, mentioned hereinbefore, which completes the vent or discharge from chamber 80 to atmosphere via discharge passage 110, these components being contained in body structure 67.

In this manually-venting position 74a of valve passage 74 of valve 76, the body of valve 76 blocks the pressure-inlet passage 72, preventing line pressure from reaching or replenishing pressure in chamber 80.

From the foregoing description, it will be seen that the inventive concepts provide a radio-controlled irrigation means by which a plurality of sprinkler assemblies may be fitted to existing water-lines of a watering system, with radio control of the valve of each sprinkler assembly operable to provide selective watering by each sprinkler assembly as desired, thereby providing the advantages of electrically-controlled actuation of individual sprinkler-outlets. Relatively little power is required, due to the valve concepts; and manual or alternate control is also provided.

Accordingly, from the foregoing description of the invention according to the illustrative embodiment, considered with the accompanying drawings, it is seen that the invention provides a novel and useful device having desirable advantages and characteristics, and accomplishing its intended objects, including those hereinbefore pointed out and others which are inherent in the invention.

It will be understood that modifications and variations may be effected without departing from the scope of the novel concepts of the invention; accordingly, it is to be understood that the invention is not limited to the embodiment thereof illustrated and described, or to the specific form or arrangement herein described and shown.

What is claimed is:

1. A fluid delivery system having a supply line and an outlet;

a main valve regulating flow to said outlet and urged to open position by force from pressure in said supply line;

a frame member;

a control means for said main valve located within said frame member and including a pressure chamber, a pressure-exhaust outlet means, independently operable first and second supply and exhaust valves for regulating pressure in the said pressure chamber, and conduit means interconnecting the pressure chamber to the supply and exhaust valves and to the pressure-exhaust outlet means so that the pressure-chamber supply and exhausting functions of the said first valve are dependent upon the position of the said second valve for respectively supplying and exhausting supply line pressure to and from the said pressure chamber, and also so that the pressure-chamber supplying function of the said second valve is dependent upon the position of the said first valve;

one of said first and second supply and exhaust valves being manually operable and the other being radio actuated.

2. The invention as set forth in claim 1, in a combination in which pressure in said pressure chamber is operative to effect valve-closure of said main flow-regulating valve against the valve-opening bias of pressure in the supply line.

3. The invention as set forth in claim 1, in a combination in which pressure in said pressure chamber is operative to maintain valve-closure of said main flow-regulating valve against the valve-opening bias of pressure in the supply line.

4. The invention as set forth in claim 1, in a combination in which the conduit means and the said first and second pressure-chamber-regulating valves are such that said first and second valves are in series-arrangement in supplying pressure to said pressure chamber from said supply line, but that said first and second valves are in parallel arrangement in exhausting pressure from said pressure chamber.

5. The invention as set forth in claim 1, in a combination in which the said first valve is the radio-actuated valve and the said second valve is the manually operable valve.

References Cited

UNITED STATES PATENTS

| 2,651,326 | 9/1953 | Ray | 251—30 |
| 3,043,331 | 7/1962 | Peters | 251—26 X |
| 2,146,878 | 2/1939 | Abrogast | 251—30 X |
| 2,345,152 | 3/1944 | Remey | 343—225 |
| 2,474,355 | 6/1949 | Griswold | 251—26 X |
| 2,937,907 | 5/1960 | Harris et al. | 343—225 X |
| 3,075,737 | 1/1963 | Cantalupo et al. | 251—26 |
| 3,265,350 | 8/1966 | Yount et al. | 251—30 |

M. CARY NELSON, *Primary Examiner.*

A. ROSENTHAL, *Assistant Examiner.*